United States Patent

[11] 3,611,211

[72] Inventor Charles Theodore
Los Angeles, Calif.
[21] Appl. No. 45,516
[22] Filed June 11, 1970
[45] Patented Oct. 5, 1971
[73] Assignee LTV Ling Altec, Inc.
Anaheim, Calif.

[54] PROTECTED PULSE MODULATOR
9 Claims, 7 Drawing Figs.

[52] U.S. Cl. 332/12, 307/106, 328/67, 332/9, 331/87
[51] Int. Cl. H03k 3/57
[50] Field of Search 332/9, 12; 307/106; 328/67; 331/87

*Primary Examiner*—John Kominski
*Attorney*—Harry R. Lubcke

ABSTRACT: An electrical pulse modulator having a saturable reactor and a shunting capacitor in addition to the known pulse-forming network. The saturable reactor is in service with a discharge triggerable solid-state device and causes the circuit to operate within the rating of the same by initially switching the current "on" at discharge, thereby reducing the *di/dt* requirement upon the device. The saturable reactor and the capacitor in shunt thereto also act as a second pulse-forming network. When the reactor saturates this network acts as if it was short-circuited and so rapidly swings toward reversal of polarity. This results in a very fast rise of the discharge pulse despite relaxed *di/dt* requirements upon the triggerable solid-state device.

INVENTOR
CHARLES THEODORE
BY Harry R. Lubcke
AGENT

PROTECTED PULSE MODULATOR

BACKGROUND OF THE INVENTION

This invention relates to an electrical pulse modulator, and particularly to one suited for rapid operation.

In modulators of this type, wherein the pulse width (duration) is short, of the order of one microsecond, the rate of change of current (di/dt) through the discharge circuit is very high. When a solid-state device, such as a silicon-controlled rectifier (SCR), is employed as the discharge switch the di/dt rating thereof very seriously restricts the power capability of the modulator.

It has been known that a saturable reactor in the discharge circuit can be arranged to switch "on" the discharge, but this arrangement results in slow initiation of the discharge and even inoperability from the practical standpoint when short pulses are to be produced.

The art has also employed saturable reactors in the cascaded type of pulse modulator, but the initiation of the discharge has also been slow.

SUMMARY OF THE INVENTION

A capacitor added to the discharge circuit of the pulse modulator alters its performance, such as to speed-up the discharge step function as to steepness of rise significantly beyond anything otherwise obtainable.

This capacitor shunts a series circuit composed of a saturable reactor and known discharge means, such as a silicon-controlled rectifier. This forms a sort of transmission line network. When this is shorted by saturating of the reactor and triggering of the discharge means the "network" very rapidly swings toward voltage inversion. This behavior gives a new order of sharpness to the initiation of the discharge of the modulator, which also includes the usual pulse-forming network (PFN), also known as a transmission line having lumped constants.

When the voltage across the additional capacitor decreases to zero it remains at zero rather than going to a negative value equal to the positive value to which it had been charged, were it an isolated circuit. This is because current from the PFN then starts to flow through the load, the saturable reactor, and the discharge means. This flow and the shunt connection of the capacitor across the saturable reactor and the discharge means prevents the voltage across the capacitor from going negative. Accordingly, this voltage remains at or near zero.

Because the saturable reactor initiates the pulse by becoming saturated, rather than for this to happen because of triggering of the discharge means, the di/dt limitation inherent in the discharge means is not directly involved. With a SCR, for example, this means that an inexpensive type may be employed, or that the speed of initiating the discharge pulse may be more rapid than before.

DESCRIPTION OF THE PREFERRED EMBODIMENTS

Figure 1:
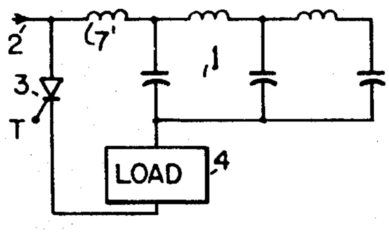
FIG. 1 is the schematic circuit of a conventional pulse-forming network modulator of the prior art.
Figure 2:
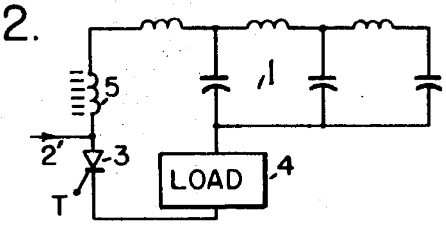
FIG. 2 is this modulator with a saturable reactor added.

FIGS. 1 and 2 have been included to most clearly define the invention over the known art.

In FIG. 1 numeral 1 indicates the known PFN comprised of plural series inductors and plural shunt capacitors. These are charged by means indicated by arrow 2 at the left and are periodically discharged by conduction through discharge means 3, which may be an SCR having a trigger electrode. A triggering source "T" is shown in simplified schematic connected to the triggering electrode. A load 4 is connected between the common terminal of the shunt capacitors and the cathode of discharge means 3. The load may be a magnetron or similar radiofrequency-producing device employed for radar purposes.

An important capability of any modulator is the capability of producing rapidly rising power pulses, so that the radio frequency generator or equivalent load will promptly produce maximum output at a stable frequency. When pulses of short duration are required this requirement on the modulator becomes even more important.

In FIG. 1 the attainment of these objectives is limited by the rate of change of current (di/dt) allowable through the SCR upon triggering. Additionally, the current must be limited to specific values as a function of time after triggering. The result is that this circuit must operate at only a small fraction of the potential capability of the SCR.

In FIG. 2 saturable reactor 5 has been added to the circuit and is of significance in the discharge path. This reactor is of the square-loop switching type. The operation of this circuit is similar to that of FIG. 1, except that the SCR does not actually switch the current. It functions to switch the discharge circuit "on," but the inductance of saturable reactor 5 is so great in the unsaturated condition that all of the voltage of the PFN appears across it. The current in the circuit is correspondingly small and none of the limitations of the SCR are exceeded. At a slightly later time the reactor saturates, its inductance drops to a very small value, and the discharge of the PFN is accomplished. This sequence of events has taken enough time (although usually measured in microseconds) so that the SCR merely conducts the discharge current then flowing in circuit 1, 4, 3, 5.

However, this circuit has the disadvantage that the maximum rate of rise of the pulse voltage, and thus the narrow-pulse performance capability, is limited. The first limitation is the rate at which the core material of the saturable reactor switches into saturation, and, secondly, the presence of the residual inductance of reactor 5 in the circuit when it is in the saturated condition.

Figure 3:
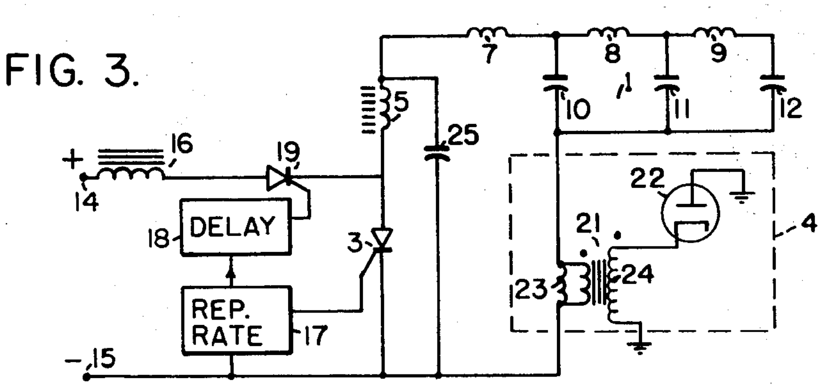
FIG. 3 is the schematic diagram for the pulse modulator according to this invention.

The circuit of FIG. 3 is according to the invention. It permits significantly faster pulse rise time than is possible with either of the prior circuits, while utilizing the full potentialities of the SCR and still remaining within its limitations.

The pulse-forming network is as before. In a specific example of a low impedance embodiment properly utilizing the large current capabilities of a SCR, inductor 7 may have an inductance of one to a few microhenries ($\mu$h), while the second inductor 8 has an inductance twice that value, and inductor 9 has approximately the same inductance as inductor 7. These are typically small, self-supporting air-core inductors, and may even be the connecting leads between the accompanying capacitors 10, 11 and 12. Typical values for the capacitors are 0.2 microfarad ($\mu$f) for each of capacitors 10 and 11, and 0.5 $\mu$f for capacitor 12. The relative values of these circuit components have an effect on the shape of the pulse and the values given provide a relatively rectangular shape. Within this invention; however, these values may be varied over a wide range to obtain a desired pulse shape and duration. The values given correspond to a pulse duration of 0.5 $\mu$s, which is short.

Charging means 2, SCR 3 and saturable reactor 5 in FIG. 3 are substantially the same as in FIG. 2; though now shown in more detail for an illustrative embodiment. A source of power of positive polarity at terminal 14 and of negative polarity at 15 provides the electrical energy for charging PFN 1. The source may have a voltage of a few hundred volts. Charging reactor 16 is connected to terminal 14. This reactor has an inductance of the order of 10 millihenries, is nonsaturating, and resonates with the total capacitance of capacitors 10, 11, 12 to execute a half-wave of resonant current during the net time available between pulses for charging the capacitors. For a repetition rate of 2,000 pulses per second a resonant frequency of about 1,700 hertz is chosen.

"Rep. rate" pulse generator 17 typically establishes the repetition rate. This may be a self-oscillatory oscillator, such as one utilizing a unijunction transistor, or it may represent triggering pulses originating in associated apparatus and made available to the modulator. This generator is connected to the trigger of solid state device 3, typically a SCR, and also to the nominal ground of the system, negative terminal 15.

In order that full advantage be taken of the high repetition rate capability of SCR 3 it is necessary to delay the reapplication of the charging voltage to the PFN to permit SCR 3 to terminate its conductive state; i.e., to permit it to "recover." This delay is provided in FIG. 3 by "delay" 18, which may be a one-shot multivibrator, of integrated circuit type if desired. This is connected to entity 17, from which the pulse to be delayed is received. The delayed pulse is conveyed to the trigger of another SCR 19, which is connected in series with inductor 16, with the anode connected to the reactor and the cathode connected to the anode of SCR 3 and the input of saturable reactor 5. Accordingly, the charging circuit is disconnected from the rest of the circuit until the delayed pulse occurs, after which full conduction is established by SCR 19. The latter is of considerably smaller current rating than is SCR 3 and has other easily obtainable required characteristics.

For sufficiently low repetition rates, of the order of 100 hertz, SCR 19 may be replaced by a simple equivalent diode and delay entity 18 may be omitted. At such low rates the charging voltage is applied slowly enough to the PFN so that the voltage is still in a small backswing (negative polarity) due to the inductance of a typical load. SCR 3 thus recovers its nonconductive state in the interim. One use that requires a low repetition frequency is a particle-accelerator, for which the repetition rate may be in the 5 to 10 hertz range.

At higher repetition rates the delay selected for entity 18 would be in the range of from 40 to 200 $\mu s$. The choice depends upon the characteristics of the particular SCR 3 employed and the current that it handles during its discharging function. The greater the amplitude of this current the longer the delay interval must be.

In an illustrative example of a 1,000 hertz repetition rate, an interval of 200 $\mu s$ is provided for the recovery of SCR 3 and another 200 $\mu s$ for the recovery of SCR 19. This leaves 600 $\mu s$ for resonant charging, which involves the inductance of reactor 16 and the combined capacitance of capacitors 10, 11, 12. Since 600 $\mu s$ is a half-period of an essentially sinusoidal wave, the full cycle would have a duration of 1,200 $\mu s$, thus a frequency of about 800 hertz. In determining this frequency the inductance of inductors 7, 8, 9 and possible leakage inductance associated with the load is small and may be neglected.

In FIG. 3 load 4 has been detailed to consist of a step-up transformer 21 and magnetron tube 22. Typically a paralleled-winding primary 23 matches the low impedance of PFN 1, while secondary 24 has numerous turns to give a step-up ratio of the order of 25 to 100. One terminal of the secondary is connected to the cathode of the magnetron, while the other terminal is connected to ground, as is the anode of the magnetron. The magnetron filament and its energizing circuit have been omitted, these being conventional.

Perhaps the key element of FIG. 3 is capacitor 25. This is connected across the series-connected discharge SCR 3 and saturable reactor 5. In the circuit for which component values have already been given this capacitor has a capacitance of the order of 0.02 $\mu f$, about one-tenth of the capacitance of input capacitor 10.

The functioning of the circuit comprised of elements 3, 5, 25 has been set forth in the summary of the invention, above.

A comparison of the rise-times of the discharge pulses produced by the circuits of FIGS. 1, 2 and 3 is as follows. For comparable conditions of component values, frequency of operation, etc., the pulse rise-time of the circuit of FIG. 1 would be of the order of 1 $\mu s$ and would occur approximately 0.3 $\mu s$ after SCR 3 was triggered because of anode delay. For FIG. 2 this would be 0.3 $\mu s$ for anode delay, 0.5 $\mu s$ for saturation of reactor 5 and 0.5 $\mu s$ for the rise of the pulse. For FIG. 3 this would be 0.3 $\mu s$ for anode delay, 0.5 $\mu s$ for saturation of reactor 5, but only 0.1 $\mu s$ for the rise of the pulse. The fractions of a microsecond delay before the initiation of the rise of any of these pulses is immaterial; these merely add to the repetition rate interval between pulses. However the net rise-time of the pulse is highly significant, particularly if the pulse duration is to be short.

For use as landing radar, pulses as short as 0.2 $\mu s$ duration have been produced according to this invention. It is seen that even with this invention such a pulse is relatively triangular in shape. However, it is also seen that with the circuits of FIG. 1 and 2 it would be impossible to produce a pulse of useful amplitude. The rise time is too slow. Moreover, considering a pulse of 2 $\mu s$ duration the circuit of the invention produces an essentially rectangular pulse, whereas the circuit of FIG. 1 would produce a triangular pulse and the circuit of FIG. 2 would produce a pulse that was quasi-triangular.

There is the possibility that the circuit of FIG. 1 could be made to give a 0.1 $\mu s$ rise time by decreasing the inductance of first inductor 7′ of the PFN to one-tenth the value normally employed to protect SCR 3 by demanding only one-tenth the current from it. Then, by paralleling nine more SCR 3 devices with the original SCR 3, the original power capability of the modulator would be recovered. This alternative is not at all practical for a commercial product.

Figure 4:
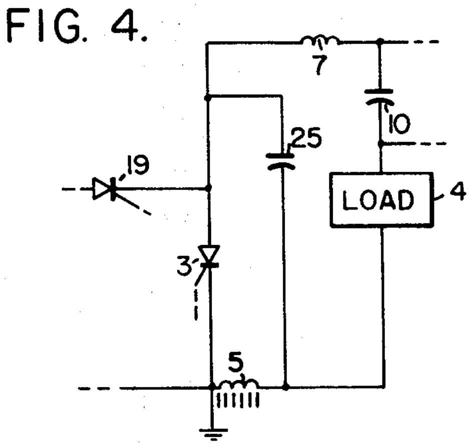
FIG. 4 is a fragmentary schematic diagram of a modification of the modulator of FIG. 3.

The modification of FIG. 4 involves placing saturable reactor 5 connected to the cathode of SCR 3 rather than to the anode as in FIG. 3. The circuit with respect to capacitor 25 has not been altered, the interchange of elements 3 and 5 in their series circuit is of no effect. Similarly, the circuit through load 4 and the input end of the PFN is not altered. In FIG. 4 it is possible to ground one terminal of saturable reactor 5 and this reduces the windings to core voltage insulation requirements thereof.

In any of the embodiments saturable reactor 5 is magnetically "reset"; i.e., the core returned to the unsaturated condition, by the charging current flowing through reactor 16 to the PFN. As an alternate, if necessary, a few turns of wire on a separate reset winding may be provided on the core of reactor 5 and the charge current from reactor 16 passed through it. Still further, a small source of direct current may instead be connected to the reset winding to accomplish resetting, being isolated from normal circuit functioning by a reactor or a resistor in series therewith.

Even though the rise-time of the discharge triggerable device might be rapid enough for a given application of the pulse modulator, the circuit of this invention may still be employed and the step-up ratio of transformer 21, or its equivalent, may be increased over what is otherwise possible. This has the advantage of a higher output voltage having a given rise time. The higher ratio transformer otherwise decreases the rise-time effective upon the ultimate load because of increased leakage inductance of such a higher ratio transformer.

In FIGS. 3 and 4 the known silicon-controlled switch (SCS) may be employed without circuit modification in place of SCR 3.

Figure 5:
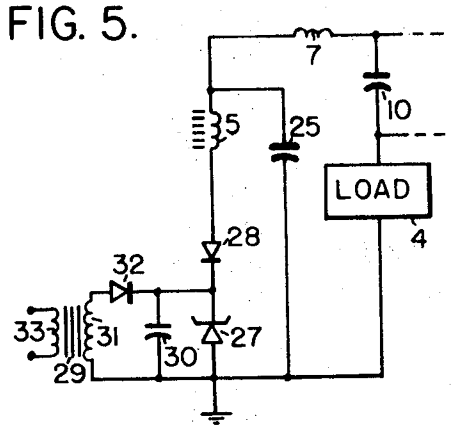
FIG. 5 is a further fragmentary diagram of a similar modification employing a different discharge means.

FIG. 5 is a further fragmentary circuit diagram related to FIG. 3, in which reverse switching rectifier (RSR) 27 takes the place of the previous SCR 3. RSRs are triggerable solid-state devices available from Westinghouse, which is switched "on" by an overvoltage of momentary duration. As seen in FIG. 5 diode 28 is connected in series with the RSR to permit such overvoltaging.

The RSR avalanches into its switch mode when it is overvoltaged. For a RSR having a normal working voltage of the order of 600 to 800 volts an overvoltage of the order of 1,000 to 1,200 volts is momentarily provided by raising the triggering voltage level, as by employing step-up transformer 29. A capacitor 30, of 0.01 $\mu$f capacitance for example, is connected across secondary 31 of the transformer, with diode 32 in series. The capacitor is charged when the PFN is charged, by virtue of the isolation provided by diode 32. When triggering for the discharge function occurs at primary 33 a further charge is given through transformer 29 to capacitor 30 and the RSR is avalanched. The circuit then performs as has been previously described.

Figure 6:
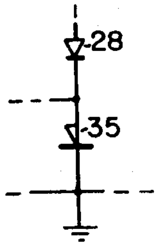
FIG. 6 is a still further fragmentary diagram according to FIG. 5 employing a still different discharge means.

Shockley four-layer diode 35 may be employed in place of the RSR 27 in FIG. 5 by mere substitution of one for the other. This is shown in FIG. 6. This diode also requires an overvoltage for triggering and the operation is as was discussed in connection with FIG. 5.

While the RSR and the four-layer diode are not as well known in the art as the SCR and are not presently available in high power ratings, the invention hereof is fully applicable to modulators that could employ these newer devices.

In considering the role' played by capacitor 25, it would be easily understood that the energy accumulated therein during the charge of the PFN would be discharged into load 4 upon discharge of the PFN if the capacitor was connected to the common lower terminals of PFN capacitors 10, 11, 12. However, in order to perform its function as part of a shorted "-transmission line" as has been described, it is connected as shown in FIGS. 3 through 6. Nevertheless, upon discharge the energy from capacitor 25 establishes the current through saturable reactor 5. The current also supplies the "front-end losses" of the modulator PFN brought about by the fact that SCR 3 is not a lossless switch. This loss would otherwise have to be supplied by energy from the front end elements 7 and 10 of the PFN. What energy remains after this loss is supplied is delivered from saturable reactor 5 to load 4.

Figure 7:
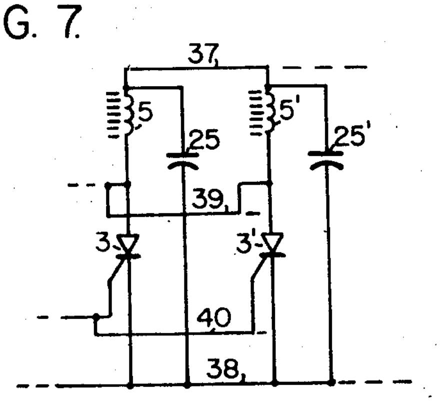
FIG. 7 is a fragmentary diagram according to FIG. 3, in which plural groups of discharge elements are employed.

Although the circuits of this invention are essentially maximized with respect to the performance and power output from the discharge devices 3, 27 or 35, even greater power capability may be desired. It has been found that paralleling two or more of the groups, similarly interconnected, comprised of saturable reactor 5, triggerable solid-state device 3, 27 or 35, and capacitor 25, is a desirable way of obtaining greater power capability. FIG. 7 shows two such groups, with connections 37 and 38 paralleling the groups per se and connections 39 and 40 paralleling the charging and triggering feeds. The dotted lines from these connections that extend to the right indicate the possibility of further paralleling. The second group of elements includes 3', 5' and 25'.

The term "solid-state device" has been used herein to denote presently known such devices. The circuits of this invention would be equally applicable, of course, to other devices differently constituted as long as the operating characteristics of these devices were similar to those of the presently known solid-state devices.

I claim:

1. An electrical pulse modulator comprising;

a. a chargeable pulse-forming network, b. charging means to periodically charge said network, c. a saturable reactor connected in series with said charging means and said network, d. a triggerable solid-state device connected to said saturable reactor and to said network to periodically discharge said network, and e. one capacitor connected across both said saturable reactor and said triggerable solid-state device, to enhance the rapidity of initiation of said discharge.

2. The modulator of claim 1 in which said charging means includes;

a. a charging reactor b. a triggerable semiconductor device connected in series with said charging reactor, and c. means to trigger said semiconductor device connected thereto, after a delay with respect to the discharge of said network.

3. The modulator of claim 1 in which;

a. the capacitance of said one capacitor is of the order of one-tenth that of the input shunt capacitor of said pulse-forming network.

4. The modulator of claim 1 in which;

a. the nonsaturated inductance of said saturable reactor is of the order of two thousand times that of the input series inductor of said pulseforming network.

5. The modulator of claim 1 in which;

a. said triggerable solid-state device is a silicon-controlled rectifier having a di/dt rating less than is required for the discharge of said pulse-forming network.

6. The modulator of claim 1 in which;

a. said triggerable solid-state device is a silicon-controlled switch having a di/dt rating less than is required for the discharge of said network.

7. The modulator of claim 1 in which;

a. said triggerable solid-state device is a reverse switching rectifier, with diode means connected to the anode 5 of said reverse switching rectifier to allow triggering of the same.

8. The modulator of claim 1 in which;

a. said triggerable solid-state device is a four-layer diode, with diode means connected to the same 5 in series with the saturable reactor to allow triggering of said four-layer diode.

9. The modulator of claim 1, which additionally includes;

a. at least one additional group, similarly interconnected, of said saturable reactor said triggerable solid-state device and said one capacitor and b. plural connections to connect said additional group in parallel with the original group of recited elements, for the energization of said additional group.